United States Patent
Barras

(10) Patent No.: US 10,372,290 B2
(45) Date of Patent: Aug. 6, 2019

(54) COMPARING 3D MODELED OBJECTS

(71) Applicant: DASSAULT SYSTEMES, Velizy Villacoublay (FR)

(72) Inventor: Pierre Barras, Aix-en-Provence (FR)

(73) Assignee: DASSAULT SYSTEMES, Velizy Villacoublay (FR)

(*) Notice: Subject to any disclaimer, the term of this patent is extended or adjusted under 35 U.S.C. 154(b) by 220 days.

(21) Appl. No.: 15/334,044

(22) Filed: Oct. 25, 2016

(65) Prior Publication Data
US 2017/0115847 A1    Apr. 27, 2017

(30) Foreign Application Priority Data
Oct. 25, 2015   (EP) .................................. 15306705

(51) Int. Cl.
*G06T 7/00* (2017.01)
*G06F 17/50* (2006.01)
(Continued)

(52) U.S. Cl.
CPC ...... *G06F 3/04815* (2013.01); *G06F 3/04845* (2013.01); *G06F 3/04847* (2013.01);
(Continued)

(58) Field of Classification Search
CPC .......... G06T 19/20; G06T 2207/30164; G06T 2219/2004; G06T 2210/62; G06T 2200/24; G06T 2217/2024; G06T 7/0006; G06T 7/001; G06T 2219/2024; G06F 3/04815; G06F 17/50; G06F 17/5086;
(Continued)

(56) References Cited

U.S. PATENT DOCUMENTS

| | | | |
|---|---|---|---|
| 2004/0143362 A1* | 7/2004 | Matthews | G05B 19/4097 700/182 |
| 2011/0141109 A1* | 6/2011 | Radet | G06F 3/0481 345/420 |
| 2015/0009214 A1* | 1/2015 | Lee | G06T 17/10 345/420 |

FOREIGN PATENT DOCUMENTS

| | | |
|---|---|---|
| EP | 2 333 682 A1 | 6/2011 |
| EP | 2 638 853 A1 | 9/2013 |
| WO | WO 2014/180944 A1 | 11/2014 |

OTHER PUBLICATIONS

European Search Report issued in Application No. 15306705.3-1502 dated Apr. 15, 2016, 7 pgs.

\* cited by examiner

*Primary Examiner* — Quoc A Tran
(74) *Attorney, Agent, or Firm* — Oblon, McClelland, Maier & Neustadt, L.L.P.

(57) ABSTRACT

The disclosure notably relates to a computer-implemented method for comparing a first 3D modeled object and a second 3D modeled object. The method comprises upon manipulation of a user-interaction tool that controls at least one non-uniform variation of the rendering of both the first 3D modeled object and the second 3D modeled object, updating the displaying of the first 3D object and the second 3D object. The user-interaction tool is configured to be manipulated via a predetermined set of at least one action, a repetition of each respective action of the set controlling a respective non-uniform variation of the rendering of both the first 3D modeled object and the second 3D modeled object. Such a method improves the comparison of a first 3D modeled object and a second 3D modeled object that each represent a part or an assembly of parts.

14 Claims, 9 Drawing Sheets
(5 of 9 Drawing Sheet(s) Filed in Color)

(51) Int. Cl.
*G06T 19/20* (2011.01)
*G06F 3/0481* (2013.01)
*G06F 3/0484* (2013.01)
*G06F 3/0488* (2013.01)

(52) U.S. Cl.
CPC .......... *G06F 3/04883* (2013.01); *G06F 17/50* (2013.01); *G06T 7/001* (2013.01); *G06T 7/0006* (2013.01); *G06T 19/20* (2013.01); *G06F 17/5009* (2013.01); *G06F 17/5086* (2013.01); *G06T 2200/24* (2013.01); *G06T 2207/30164* (2013.01); *G06T 2210/62* (2013.01); *G06T 2219/2004* (2013.01); *G06T 2219/2024* (2013.01)

(58) Field of Classification Search
CPC ............... G06F 17/5009; G06F 3/0487; G06F 3/04845; G06F 3/04883
See application file for complete search history.

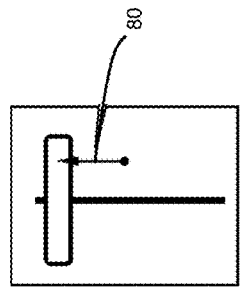
FIG. 8
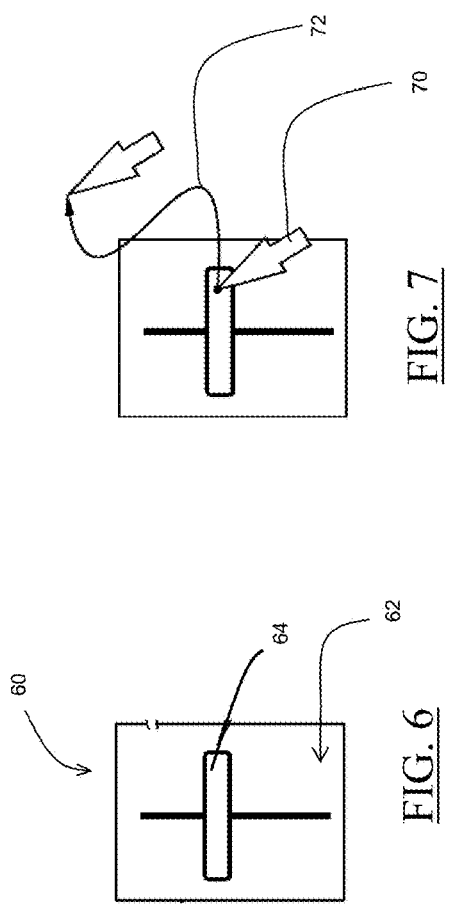
FIG. 7
FIG. 6
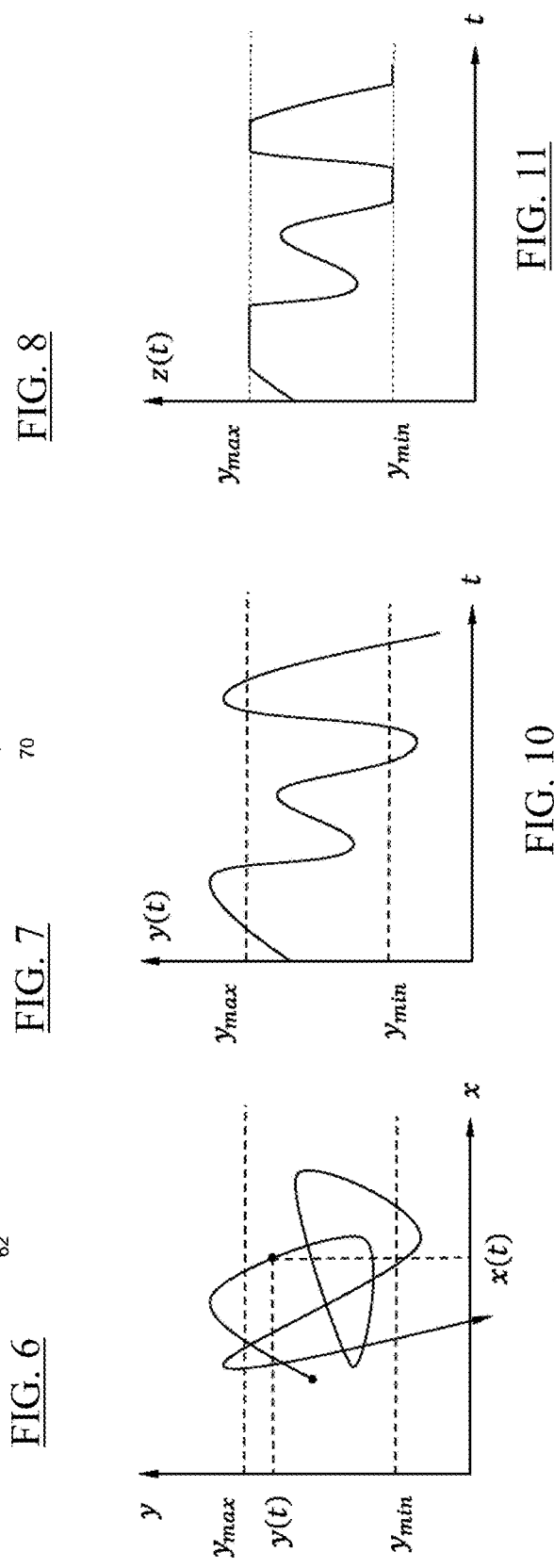
FIG. 11
FIG. 10
FIG. 9

COMPARING 3D MODELED OBJECTS

FIELD OF THE INVENTION

The invention relates to the field of computer programs and systems, and more specifically to a method, system and program for comparing a first 3D modeled object and a second 3D modeled object that each represent a part or an assembly of parts.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

When designing a virtual assembly of solid parts with a CAD system, identifying the changes between two versions of the same initial solid or assembly of solids is a common task. Geometrical comparison is also more and more required in all domains where 3D virtual objects are used, including consumer services on mobile devices. Different software solutions exist to perform such comparison, but none of them is entirely satisfactory. Within this context, there is still a need for an improved solution for comparing a first 3D modeled object and a second 3D modeled object that each represent a part or an assembly of parts.

SUMMARY OF THE INVENTION

It is therefore provided a computer-implemented method for comparing a first 3D modeled object and a second 3D modeled object that each represent a part or an assembly of parts. The method comprises displaying the first 3D modeled object and the second 3D modeled object superposed in a same scene; and upon manipulation of a user-interaction tool that controls at least one non-uniform variation of the rendering of both the first 3D modeled object and the second 3D modeled object, updating the displaying of the first 3D object and the second 3D object. The user-interaction tool is configured to be manipulated via a predetermined set of at least one action, a repetition of each respective action of the set controlling a respective non-uniform variation of the rendering of both the first 3D modeled object and the second 3D modeled object.

The method may comprise one or more of the following:
  the predetermined set of at least one action comprises a first action and a second action, the variation controlled by a repetition of the first action being inverse to the variation controlled by a repetition of the second action;
  the first action and the second action each result from a pressure of a respective predetermined key, a scrolling in a respective direction and/or a respective moving action of a pointing device;
  the user-interaction tool includes a slider and the respective moving action is a move of the slider in a respective direction, and/or the user-interaction tool includes a touch device and the respective moving action is a single touch moving action in a respective one of a predetermined pair of directions and/or a double touch moving action which is a respective one of a spreading gesture or a joining gesture;
  the first action increases visibility of the second 3D modeled object relative to the first 3D modeled object, and the second action thereby increases visibility of the first 3D modeled object relative to the second 3D modeled object, the first action and the second action thereby controlling relative visibility between the first 3D modeled object and the second 3D modeled object in a one-dimensional domain;
  the first action increases the value of a predetermined rendering parameter for the first three-dimension object while decreasing the value of the predetermined rendering parameter for the second three-dimension object, and the second action increases the value of the predetermined rendering parameter for the second three-dimension object while decreasing the value of the predetermined rendering parameter for the first three-dimension object;
  the predetermined rendering parameter is transparency;
  the one-dimensional domain comprises a first boundary sub-domain where the rendering of the first 3D modeled object is opaque and the rendering of the second 3D modeled object is invisible, and a second boundary sub-domain where the rendering of the second 3D modeled object is opaque and the rendering of the first 3D modeled object is invisible;
  the one-dimensional domain further comprises a central sub-domain where the renderings of both the first 3D modeled object and the second 3D modeled object are opaque, the central sub-domain having optionally a non-zero length;
  the one-dimensional domain further comprises a first intermediary sub-domain between the first boundary sub-domain and the central sub-domain, and a second intermediary sub-domain between the second sub-domain and the central sub-domain, and the rendering of the first 3D modeled object is opaque and the rendering of the second 3D modeled object is transparent in the first intermediary sub-domain; and the rendering of the second 3D modeled object is opaque and the rendering of the first 3D modeled object is transparent in the second intermediary sub-domain;
  transparency varies continuously and monotonically in the first and second intermediary sub-domains; and/or
  the user-interaction tool is further configured to be manipulated via at least one other predetermined action that defines the first 3D modeled object as a portion of a first 3D assembly and the second 3D modeled object as a portion of a second 3D assembly, the other portion of the first 3D assembly and the other portion of the second 3D assembly being displayed throughout the method with a transparency higher than respectively the first 3D modeled object and the second 3D modeled object.

It is further provided a computer program comprising instructions for performing the method.

It is further provided a computer-readable storage medium having recorded thereon the computer program.

It is further provided a system comprising a processor coupled to a memory and to a user-interaction tool, the memory having recorded thereon the computer program.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the invention will now be described, by way of non-limiting example, and in reference to the accompanying drawings, where:

FIGS. 4, 5, 6, 7, 8, 9, 10, 11, 12, 13, 14 and 15 illustrate an example of the method and system.

DETAILED DESCRIPTION OF THE INVENTION

Figure 1:
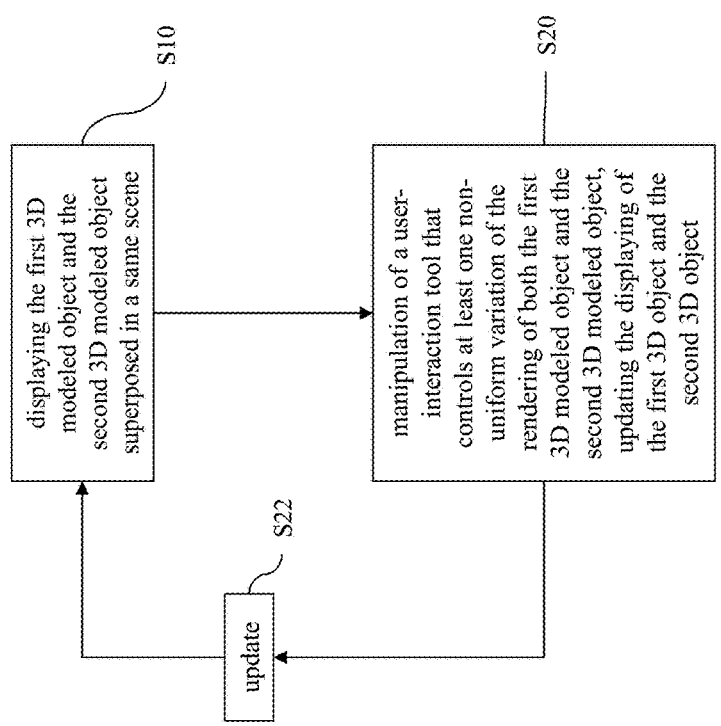
FIG. 1 shows a flowchart of an example of the method.

With reference to the flowchart of FIG. 1, it is proposed a computer-implemented method that improves the comparing of a first 3D modeled object and a second 3D modeled object. By "comparing", it is here merely meant that the method is performed by a user (e.g. a designer) interacting with a computer system, and the method provides the displaying S10 to the user of information relating to the first 3D modeled object and to the second 3D modeled object. "Comparing a first 3D modeled object and a second 3D modeled object" can thus be generally seen as consisting of the user-interaction and the accordingly evolving display. The user may then perform the comparison (in any way) based on said information. How the user-interaction with the computer system and how the displaying S10 are performed are explained hereunder with reference to FIG. 1.

The first 3D modeled object and the second 3D modeled each represent (e.g. the geometry of the physical shape of) a part or a portion or assembly of parts (e.g. possibly independently one of another—i.e. possibly the first 3D modeled object representing a single part while the second 3D modeled object representing an assemble of several parts or vice versa—, or on the contrary in the most common case consistently one with the other—i.e. the first and second 3D modeled object and the second 3D modeled object both representing a single part or alternatively an assembly of several parts—possibly with a same or different number of parts in each of the two assemblies). At this point, it is thus noted that the first 3D modeled object and/or the second 3D modeled can represent conversely a single part or an assembly of several parts. However, the following discussions of the method will often refer to an assembly of parts, but will also apply to the single part case without any loss of generality. Indeed, a single part can be viewed as the assembly of portions thereof, and the portions may be identified in any known way (e.g. according to the format of the modeled object if such format allows a direct or fast retrieval of such portions, and/or according to any type of geometrical analysis of the part).

The method comprises the displaying S10 of the first 3D modeled object and the second 3D modeled object superposed in a same scene (simultaneously and on the same display). In other words, not only does the computer system display at S10 to the user, at the same time (i.e. concomitantly/concurrently), a visual/graphical representation of the first 3D modeled object and a visual/graphical representation of the second 3D modeled object (i.e. the displaying S10 thus presenting the—e.g. accurate—shape of the part or the assemblies of parts), but these representations are displayed at S10 at the same location of the displaying device. In the field of CAD, such location is commonly called "scene" and it corresponds to specifications of a 3D space represented to the user. Thus, the computer system defines a single and same scene for displaying S10 both the first and second 3D modeled objects to the user at the same time.

Now, by "superposed" it is meant that the graphical representation of the first object is positioned (on the display provided by the display device) at a location substantially confounded with the location of the graphical representation of the second object, such that the renderings of both objects overlap at least partly (spatially on the display). For example, the first and second 3D modeled objects may have at least one common part (e.g. geometrically speaking, i.e. a part presenting exactly the same geometry, at least substantially)—or equivalently at least one common portion. The method can use such at least one part to determine the result of a (geometrical) calibration of the positioning of the first 3D modeled object and the positioning of the second 3D modeled object based on the common part, e.g. such that the (version of the) at least one common part belonging to the first object and the (version of the) at least one common part belonging to the second object are displayed at S10 superposed (i.e. in a perfect geometrical overlap, i.e. they occupy the same geometrical space of the scene), possibly with no distinction between them. How such calibration may geometrically be performed is known per se. Moreover, how the superposition can be performed in case there are more than one common part (and there is not one single calibration possible) is merely a matter of implementation and it is also known per se. For example, this can include identifying common groups of parts, assigning ranks to the different groups (e.g. according to a number of parts in the groups and/or a volume of the parts of the groups) and selecting a highest ranked group for the calibration.

In an example, the first 3D modeled and the second 3D modeled object are different versions of a same initial 3D modeled object (e.g. one or both versions resulting from—independent—editions of the initial 3D modeled object, e.g. by different users and/or at different times, e.g. such editions being included in a global process that also includes the method). In such a case, the data defining the first 3D modeled and the second 3D modeled objects can comprise information stemming from keeping track of the moving editions and/or the scaling editions and/or addition/removal of identified parts editions, undergone by the initial 3D modeled object, such that the result of the calibration may be simply determined by synchronizing such information for both objects.

Also, the case where the first and second objects have no common origin and no common part is left aside as it is of relatively low importance to the present discussion (for example, the objects are superposed randomly in such a case). In an implementation, the first and second 3D modeled object have at least 25% of the parts of one of them in common (in terms of number and/or volume of the parts), or even 50% or 75%.

The displaying S10 is performed throughout the method, as a background process. But the method allows, as explained earlier, user-interaction with the computer system so as to update S22 the displaying S10 upon the user-interaction. In other words, upon specific predetermined user-interactions S20, the computer system updates S22 the displaying S10 accordingly, e.g. substantially real-time—i.e. synchronously—e.g. substantially seamlessly (depending on the size of the data and hardware resource at stake). Notably, the method comprises one such user-interaction S20 that involves said update S22 (i.e. the displaying S10 is modified upon said user-interaction, according to the user-interaction). This specific user-interaction is manipulation S20 of a specific user-interaction tool (thus, by a user interacting with the computer system) provided by the computer system (e.g. in a graphical user interface). By "user-interaction tool" it is meant any software (e.g. graphical or not) tool that allows the user to input commands to the system via user-machine interaction (e.g. graphical interaction with the display, e.g. via hardware). Thus, the method can be iterated, as shown in FIG. 1, upon the user repeatedly/continuously manipulating S20 the user-interaction tool, the displaying S10 being updated throughout the iterations.

The user-interaction tool specifically controls variations of the rendering of both the first 3D modeled object and the second 3D modeled object. As widely known from the field of computer graphics, in order to display a 3D modeled object any computer system first calculates/determines/generates a rendering of the 3D modeled object. Such rendering process is most often performed by a graphical processing unit (GPU) of the computer system. Thus, throughout the method, each time the first and second 3D modeled objects are displayed by the computer system (e.g. via a display device of the system), for example at S10 and/or upon any update S22, the computer system first performs the rendering such that upon manipulation S20 of the user-interaction tool the method updates such rendering (thereby updating S22 the displaying S10). The initial displaying S10 can be performed upon an initial action from the user, e.g. launching a specific comparison functionality of the system. At this initial displaying S10, the rendering of the first 3D modeled object and the rendering of the second 3D modeled object can be determined in any way, for example randomly, or by retrieving stored rendering values of a previous session, or yet in an example as the center of the one-dimensional domain mentioned later (e.g. same rendering for both objects).

"Variations" of the rendering are mentioned because a same 3D modeled object can generally be displayed (e.g. by a same computer system) according to different renderings (e.g. even if determined by a same GPU). Indeed, as known per se, rendering techniques may involve different rendering parameters to which different values can be assigned (e.g. said values being generally defined as a weight between 0 and 1—or equivalently 0 and 100—, but not necessarily, since any value in any domain can be implemented), thereby leading to different visual aspects when displaying rendered objects. Example of such parameters may include transparency (as discussed later), resolution, intensity (of a color or of grey scale), and/or shading. A "variation of the rendering of both the first 3D modeled object and the second 3D modeled object" is thus a list (i.e. ordered set) of (e.g. consecutive) couples (i.e. ordered pairs) of renderings (e.g. a "rendering" here designating a specific value of a predetermined set of at least one rendering parameter—e.g. the value thus being possibly a vector of dimension strictly higher than 1), each rendering of each couple being associated to a respective one of the first 3D modeled object and the second 3D modeled object.

Thus, via the user-interaction tool and depending on how the user-interaction tool is manipulated, the user can implement different such lists (selected from a predetermined set of at least one variation that comprises at least the ones discussed herein, notably at least one non-uniform variation—the whole set of variations controlled by the user-interaction tool possibly comprising other variations not discussed here) and thereby modify the display S10 accordingly. By "non-uniform" variation, it is meant that the rendering of the first 3D modeled object and the rendering of the second 3D modeled object evolve in different ways along the variation (not necessarily independently, but in different ways). By "different ways", it is merely meant that the variation puts emphasis on different aspects of the first and second objects through the sequence defined by the variation, but that this evolution of emphasis is not synchronized between the first and second objects, such that the user can perform a comparison (as both objects are superposed and the user's eye can thus see both renderings vary non-uniformly at the same time, i.e. on the same spot of the display). For example, the rendering of the first 3D modeled object and the rendering of the second 3D modeled object at any time can each be fully defined by (and thus amount to) a "rendering value", meaning that such renderings are each defined by a set of at least one value (corresponding to the value retained for a predetermined set of at least one rendering parameter, the value being thus a vector if strictly more than one rendering parameter is retained). The rendering (value) of the first 3D modeled object and the rendering (value) of the second 3D modeled along a respective above-mentioned "variation" can then be seen as a sequential function (defined on the order provided by the list) that provides such rendering value. Now, if the respective variation is non-uniform, this can merely mean that the functions (of the first 3D modeled object on the one hand and of the second 3D modeled object on the other hand) are not proportional one to the other (e.g. the projection of the functions on any rendering parameter dimension are not proportional). Such non-uniform variations when displayed constitute a comparison as they provide information to the user that help in performing a comparison (by the user).

Moreover, the user-interaction tool is configured to be manipulated (at least) via a predetermined set of at least one (user-performed) action (e.g. exactly two such actions in the following), and the repetition of each respective action of the set controls a respective (such non-uniform) variation of the rendering of both the first 3D modeled object and the second 3D modeled object. As most user-interaction tools, the user-interaction tool provided by the method can be manipulated via predetermined actions (pre-parameterized or parameterized by the user). The predetermined action(s) of the above-mentioned set have the specificity that, when they are repeated, the user can control a respective non-uniform variation via such repetition. In other words, the user can via such repetition achieve the respective variation (i.e. make the renderings take the values of the variation over time). Other predetermined actions can be provided to manipulate the user-interaction tool without controlling any non-uniform variation(s) (such as an activation action and/or a deactivation action of the user-interaction tool). Alternatively, the whole set of actions that can manipulate the user-interaction tool can consist exactly of such predetermined actions whose repetition controls a respective non-uniform respective variation of the rendering of both the first 3D modeled object and the second 3D modeled object (optionally, with the addition of an activation action and/or a deactivation action). This makes the manipulation of the user-interaction tool simpler to the user.

By "repetition", it is meant that a single and same action of the predetermined set (any action selected within the set) is performed by the user a plurality of times, in any type of iteration. In an example, while manipulating the user-interaction tool and performing the repetition, the user does not perform any other action (e.g. at least one that controls the user-interaction tool). An action can be defined as a most basic (i.e. smallest or shortest) gesture/manipulation performed by a user and translated into an input signal in the computer system. Thus, while the user can usually repeat actions in a continuous manner or in a discrete manner, the computer system receives the repeated input stemming from the user action in a discrete manner (as the user actions are transformed into numeric data at some point). Thus, in the present discussion, the expression "repetition of action" indifferently designates the discrete/continuous repeated action from the point of view of the human user, or the associated discrete repeated action from the point view of the computer system. The method relates to a user-interaction method, and when the present discussion refers to user actions, it is understood by the skilled person that this is translated in input data from the computer system's point of view. How such translation is performed is out of the scope of the present discussion, as this is merely a matter of implementation.

Specifically, provided the current rendering (of the objects being displayed) is a value taken by the non-uniform variation (being noted that the system can provide for achieving this condition in any way, and also that the system can provide for identifying to which step of the list defined by the variation the current rendering corresponds in any way—e.g. in case the variation is not monotonous and/or implements several times the same rendering along the list), each time the respective action is performed, the system updates the rendering along the variation from the current rendering to the next rendering (i.e. the one of the next step on the list provided by the variation). Thus, by repeating the respective action, the user can implement the variation step-by-step. In other words, each respective action controls a sequential update of the rendering along the respective non-uniform variation.

Because the repetition of a respective action controls a respective variation, the user can perform real-time such a variation through repetitions of S20 and graphically visualize the evolving displayed result through repetitions S22, without leaving the eye focus from the scene (notably, without looking at any position involved in the execution of the respective action). Indeed, the method ensures that the user can perform the respective action the first time in any way, possibly by looking at a hardware and/or graphical tool and/or at a specific location of the scene (e.g. providing a graphical user-interaction tool), but then repeat said action while continuously looking at the location of the scene where the first and second 3D modeled objects are displayed superposed (e.g. without ever looking elsewhere), thereby providing an ergonomic way to perform the comparison. Detailed examples are provided later.

This is first in contrast with methods that consist in identifying differences between two versions of an assembly, say version A and version B, and that run as follows. Two windows are used to display one version in each window and the viewpoints are synchronized. Some coloring is mapped on version A (resp. version B) to localize the similarities and differences with version B (resp. version A). The problem of such solution is that the user must switch from one window to the other in order to appreciate differences. On the contrary, in the case of the method of FIG. 1, the computer system defines a single and same scene for displaying both the first and second 3D modeled objects to the user at the same time, such that the user's viewing (i.e. the user's eye) can be focused on the same area of the display and ergonomically visualize both objects.

This is also in contrast with methods that consist in identifying differences between two versions of an assembly as follows. Both versions are displayed on the same three dimensional window of the computer, and three types of parts are sorted out by the system. Parts that are identical in both versions. Parts of version A that do not coincide with any part of version B. Parts of version B that do not coincide with any part of version A. In such a solution (but this can also be implemented in the method of FIG. 1), a typing convention may be applied. Identical parts are said to be of "type 0". Parts of version A not in version B are "type 1". Parts of version B not in version A are "type 2". Identical parts are displayed using transparency. This is because they may hide other parts that are not identical. In order to analyze non identical parts, three radio buttons can be used by the designer. By selecting button 1, type 1 parts are displayed and type 2 parts are not. Selecting button 2, type 2 parts are displayed and type 1 parts are not. Selecting button 3 type 1 parts and type 2 parts are both displayed. When interacting with such a graphical user interface, the designer must change the focus twice at each radio button selection. Watch the three dimensional view, move the focus to the radio button, move the mouse cursor onto the said radio button, click on the radio button and, finally, move the focus onto the three dimensional view. The problem of such solution is that it is not possible for the user to keep the focus on the three dimensional view and to select radio buttons. Even if the user is agile enough to click on a radio button while looking elsewhere, it is not possible to move the mouse cursor on a radio button without looking at it. In other words, interesting features (some parts are hidden, others are showed) are displayed in the three dimensional view when the designer is looking elsewhere (at the radio button). When analyzing changes between similar (but not exactly the same) parts, the overlapping areas are of particular importance. The point is that in order to appreciate these overlapping areas, the user must look at them carefully during the visibility switch, which is impossible. On the contrary, in the case of the method of FIG. 1, the user is able to trigger the display of overlapping areas while keeping the focus on the three dimensional view. By repeating a respective action, the visual analysis is made possible since renderings of parts of version A and parts of version B vary non-uniformly (for example, they may alternately appear and disappear under the visual control of the designer). Furthermore, this provides a more comfortable environment because of less visual focus changes.

The method is computer-implemented. This means that the steps (or substantially all the steps) of the method are executed by at least one computer, or any system alike.

Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined. For instance, the step of displaying S10 and of updating S22 is performed by the computer only (even if triggered by the user involved in S20). But the step of manipulation S20 is performed via user-interaction as extensively discussed above.

A typical example of computer-implementation of the method is to perform the method with a system adapted for this purpose. The system may comprise a processor coupled to a user-interaction tool and a memory, the memory having recorded thereon a computer program comprising instructions for performing the method. The memory may also store a database (e.g. storing a plurality of 3D modeled objects, including the first and second 3D modeled objects). The computer system may also comprise a display device for performing the displaying. The computer system may also comprise a graphical user interface (GUI) or a touch user interface (TUI). The user-interaction tool may include or consist of a graphical user-interaction tool and/or a touch user-interaction tool. The memory is any hardware adapted for such storage, possibly comprising several physical distinct parts (e.g. one for the program, and possibly one for the database). The system may also comprise hardware that allow manipulation of the user-interaction tool, such as any or several of those discussed later in examples (for example, one or several keys—e.g. a keyboard—, a scrolling device—e.g. a mouse—, and/or a pointing device—e.g. a mouse or touch device, such a touch pad or a touch screen).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The first or second 3D modeled object may represent the geometry of a product to be manufactured in the real world subsequent to the completion of its virtual design with for instance a CAD software solution or CAD system, such as a (e.g. mechanical) part or assembly of parts, or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The first or second 3D modeled object in the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 2:
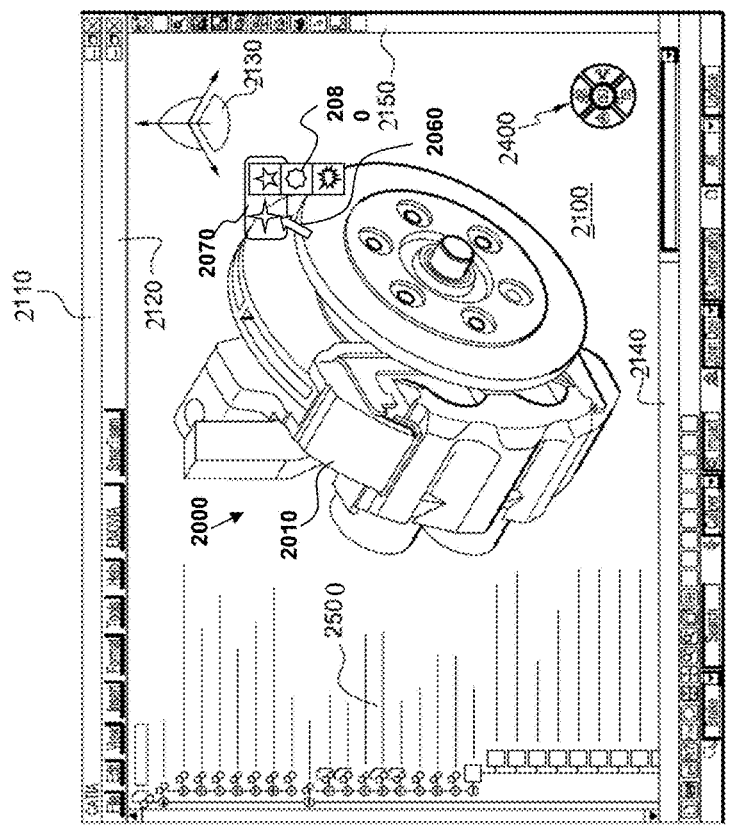
FIG. 2 shows an example of a graphical user interface of the system.

FIG. 2 shows an example of the GUI of the system, wherein the system is a CAD system e.g. displaying the first or second 3D modeled object 2000, e.g. before triggering the method of FIG. 1.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
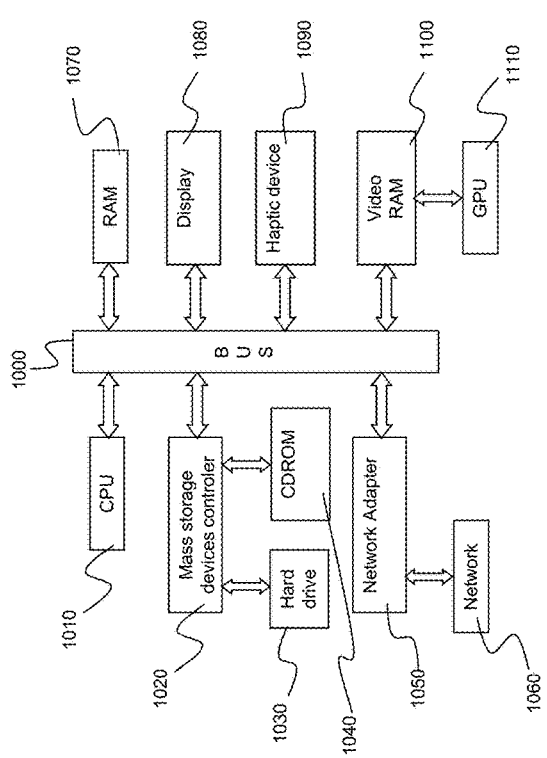
FIG. 3 shows an example of the system.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard, a touch pad or touch screen or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive (e.g. touch) pad, and/or a sensitive (e.g. touch) screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method may be included in global process for designing a 3D modeled object, for example starting from the first (or second) 3D modeled object, after a (possibly iterated) execution of the method of FIG. 1 and then validation of compared objects by the user. "Designing a 3D modeled object" designates any action or series of actions which is at least part of a process of elaborating a 3D modeled object.

Thus, the method may comprise creating the 3D modeled object from scratch. Alternatively, the method may comprise providing a 3D modeled object previously created (for example the validated first or second 3D modeled object of the method of FIG. 1), and then modifying the 3D modeled object.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

The at least one non-uniform variation of the rendering of both the first 3D modeled object and the second 3D modeled object is now further discussed. As mentioned earlier, the rendering of the couple consisting of the first 3D modeled object and the second 3D modeled object (thus, the couple of corresponding renderings) can theoretically evolve in a domain of values provided (i.e. "authorized") for one or more predetermined rendering parameter(s). A variation (including the non-uniform variations contemplated by the method) is a sequence/list of such couples of values. Two variations are said to be inverse one to the other if they define a same set of rendering couple values (i.e. couples of rendering values defined for the first and second object), and the (couple) values taken by one variation from the beginning of the variation to the end are the same taken by the other variation, but from the end to the beginning.

The predetermined set of at least one action discussed above may comprise (or even consist of) two specific actions: a "first" action and a "second" action. These actions may be different from the inputted signal point of view, and they may also be different from the user point of view, such that the user can transition from/to the first action to/from the second action without any intermediary action and possibly at any time (although alternatively the respective variation controlled by each action may be selected via context). These first and second actions have the specificity that they control inverse (non-uniform) variations. Thus, the user may visit all values of the set of rendering couple values in any order, by combining appropriately the first action and/or the second action, each being—at every use—repeated the necessary number of times. This provides high ergonomics to the user, as the user can replay the corresponding variations at will.

More specifically, for all non-uniform variations controlled by a respective repetition of the first action and contemplated by the method, there is also an inverse variation controlled by a respective repetition of the second action, and vice versa. Moreover, the respective repetition of the first action may correspond to the respective repetition of the second action (i.e. beginning or ending rendering value corresponding respectively to ending or beginning value, and/or same number of repetitions). Notably, as discussed in examples provided later, the first (respectively second) action can increase (respectively decrease) the relative value of a rendering parameter between the first and second object, thereby allowing the user to increase and decrease said value at will by appropriate repetitions of the first and/or second actions, each repetition not necessitating the user to look at what he/she is controlling, thereby allowing the user to focus on the scene.

Examples of the first and second action are now discussed. The examples below provide a pair of actions, and each action of the pair corresponds indifferently to the first action or to the second action. It is noted that the user-interaction tool may actually consist of only one pair but comprise alternatively several pairs, thereby implementing several first actions and several second actions (thus allowing different ways to achieve the same non-uniform variations). Also, combinations between the examples can be contemplated, as well as combinations between a part (i.e. half) of the examples and any other action. However, in an implementation (respected by the examples provided below), the first action and the second action are intuitively connected, such that the system offers high ergonomics to the user. By "intuitively connected", it is meant that the first and second action go by pair within the whole hardware provided for user-interaction with the system. In examples, the transition between the first action and the second action is simple to achieve, for example the transition is achievable with no look (and thus without leaving the eye from the scene). This is known from the field of computer user-interaction tools.

For example, the first action and the second action may each comprise (e.g. consist of) a pressure of a respective predetermined key (e.g. of a keyboard connected to the computer system). The two keys may be interrelated and/or close to each other, such that a standard user can keep two fingers on them at all times and control any of them with no look (for example two adjacent keys—or separated by only one key—, for example left and right arrow key, or "-" and "+" keys, or up and down arrow keys). In another example, the first action and the second action are respectively a scrolling (of a scroll wheel controllable e.g. with a mouse-like device—such as a mouse- or of a graphical scroll bar) in a respective direction.

In yet another example, particularly ergonomic, the first action and the second action is a respective moving action of a pointing device. In a such a case, the pointing device offers a way to implement a gesture-based and thus progressive way to manipulate (via graphics and/or touch) the user-interaction tool and interact with the system. The progressivity of the interaction may correspond to the progression within the corresponding respective variation. Indeed, the continuous progression of the move is interpreted by the system as a discrete repetition of (unitary) moves corresponding to the repetition that controls the respective variation.

A pointing device is any input/haptic interface provided by a GUI and/or TUI, with the specificity that the user-machine interaction offered by such a device implies that at least one location on the graphical interface and/or the touch interface is always pointed during the user-machine interaction (i.e. the computer system continuously performs computation of such location based on how the pointing device is used), the set of such locations relative to time corresponding to the move of the pointing device. The location can be the cursor position when the device is a cursor controller, e.g. a mouse, but it can also be the position touched by a finger or by a touch pen when the device is a touchpad or touchscreen. In the latter case, the location can also be the middle of the positions touched by two fingers and the set of pointed locations include the two finger positions, but it may also include the middle thereof, as the computer may continuously compute said middle when the touchpad is touched by two fingers (at least when the two fingers are moved—during a zoom for example). A moving action of a pointing device is a physical action performed by the user, and from the computer system it corresponds to a move of the at least one location in a respective predetermined way/configuration (e.g. a respective direction and/or a respective orientation), as explained below in examples.

Notably, the user-interaction tool may include a (graphically visible) slider (as provided in the illustrated examples provided later) and the respective moving action is (i.e. it corresponds to, i.e. it commands) a move of (e.g. the button of) the slider in a respective direction (e.g. provided by the slider bar). The first action and the second action thereby correspond to graphical user-interaction. The slider may be controlled in any way known by the prior art. For example, a slider may be displayed as a slider button on a line (in the slider bar), and the move of the slider may require an activation action (e.g. a click on the slider button and/or a touch or pressure of the slider button—in case of a touch display), and then that the activation action is continuously performed while the moving action is performed (e.g. the click and/or the touch/pressure must be maintained). Also, it may or may not be required that the pointer or the touch point be always on the slider button. In case it is not required (as usually the case with slider), the system may provide, as known per se for slider bars, that the location is permanently projected on a line of the slider bar and that the move of the pointer is thus also projected, and that the direction of the projection of the move determined direction of the move of the slider. Also, as known, the slider bar may comprise boundaries, thereby restricting user-interaction with the slider.

In a similar example, the user-interaction tool includes a touch device and the respective moving action is a single touch moving action in a respective one of a predetermined pair of directions. Not only, a graphically visible slider bar may as mentioned above be manipulated via touch, but also the system may provide for a virtual slider bar (not displayed), and activated by a touch of a specific area of the scene (e.g. indicated to the user via a specific graphical indicator). The slider bar can take any orientation when activated. In another example of a touch-interaction to perform the first and/or second action, the first and second actions can be a double touch moving action which is a respective one of a spreading gesture or a joining gesture. Such features are usually dedicated to zoom in or zoom out commands, but for example if performed in a specific area of the scene (e.g. indicated to the user via a specific graphical indicator) they can command the first and second action.

In both cases, the activation of the user-interaction tool can be performed by a touch of a specific area of the superposed first and second 3D modeled object. This can perform selection of a portion of the assembly of parts (as a portion of the 3D scene) where the comparison is to be made. The method of FIG. 1 (and notably the update) can then be restricted to this portion (in other words, the user-interaction also initially operates selection of the first and second 3D modeled objects contemplated in the method of FIG. 1 from larger objects), or an increase of transparency can be applied to the rest of the 3D scene (in any way), thereby highlighting what happens in the selected portion. This creates a synergy between control of the non-uniform variation and selection of sub-parts of the first and second 3D modeled objects. Alternatively, the selection of such a portion can be performed in another way by the user, for example if the user-interaction tool is of another type.

In an implementation, an internal variable of the system may be (substantially) continuously increased or decreased by (continuous) repetition of a predetermined action with the pointing device (e.g. repetition of a move), the respective variation may be in accordance progressively performed. This increases flexibility of user-interaction and handiness of the system. Here, the term "repetition" does not imply that the action is discretely iterated from a user point of view. Indeed, in the case of a mouse cursor moving a slider or two fingers joining or spreading away from each other, the action is substantially continuously intensified (instead of being iterated) from a user point of view. From a computer system point of view however, there is indeed a computation iteration, due to the fact that computer systems handle numeric signals only (the iteration is typically at the pixel-level). This concept, is covered here by the expression "repetition of a predetermined action". So, as the internal value is progressively increased or decreased, a respective non-uniform variation is progressively browsed in display S10. The term "progressively" means that there is a progression in the display as the first/second action command is detected.

The non-uniform variations contemplated by the method may include at least one variation where the first 3D modeled object is more and more visible relative to the second 3D modeled object and at least one variation where it is the inverse. This helps the user in performing the comparison. Notably, the first action may increase visibility of the second 3D modeled object relative to the first 3D modeled object. Thus, as the variation controlled by the second action is the inverse of the one controlled by the first action, the second action increases visibility of the first 3D modeled object relative to the second 3D modeled object. As a consequence, the first action and the second action can control the relative visibility between the first 3D modeled object and the second 3D modeled object in a one-dimensional domain. The one-dimensional domain can consist of the set of unidimensional values (e.g. a real number, integer, or natural number) taken by an internal parameter of the system or by an abstract parameter (the examples provided below will pertain to such an abstract one-dimensional parameter, mathematically related to real parameters) that represents said relative visibility.

Here, relative visibility can be increased/decreased in any way associated to an application of the method. Specific colors can be used. Intensities of colors can also be contemplated. In examples provided later, transparency is contemplated. In a relatively general case, relative visibility between the first 3D modeled object and the second 3D modeled object is controlled via a predetermined rendering parameter (e.g. transparency). In specific, the first action increases the value of the predetermined rendering parameter (e.g. which decreases visibility of the first 3D modeled object) for the first three-dimension object while at the same time the same first action decreases the value of the predetermined rendering parameter for the second three-dimension object (e.g. which increases visibility of the second 3D modeled object). Inversely, the second action increases the value of the predetermined rendering parameter for the second 3D object while it decreases the value of the predetermined rendering parameter for the first 3D object. The predetermined rendering parameter in such a case is any one that is monotonically associated to visibility of a displayed 3D object, for example transparency. As mentioned earlier, a rendering parameter is a value associated to a 3D modeled object provided to the rendering process of the system (e.g. embedded in the GPU) for generating (with other values) the graphical representation of the 3D modeled object eventually displayed. In an example, all other rendering parameter values are kept fixed while the first and/or second action are repeated.

As mentioned above, the predetermined rendering parameter can be transparency. Transparency is widely known rendering parameter that represents the proportion of color represented for the rendered object relative to the background. As known per se, GPU usually implement a so-called alpha coefficient to represent transparency. This allows a relatively low graphical load in the display S10, such that the user can easily perform the comparison. In such a case, the notion of relative visibility between the first 3D modeled object and the second 3D modeled object can be associated to a concrete value of relative transparency between the two objects. Thus, by manipulating the user-interaction tool via (e.g. repetition(s)) of the first action and/or the second action, the user can non-uniformly and progressively vary the (rendered) transparency of the first and second 3D object at the same time, thereby achieving comparison between the two objects. The user can thus act on two dependent values (that are related but vary non-uniformly): transparency of the first 3D object on the one hand, and transparency of the second 3D object on the other hand. The one-dimension domain mentioned above and on which the user can act can thus be defined in any way, for example as any value representative of the relative transparency between the first 3D modeled object and the second 3D modeled object.

In case the first and/or the second action are a respective moving action of a pointing device, the moving action can be performed within extremities and the moving action can define a location between such extremities at any time. For example, a graphically displayed slider bar generally has such extremities. Also, a virtual slider bar (not displayed) can similarly have virtual extremities. In such a case, the extremities of the moving action (or zones including such extremities) may correspond to boundary sub-domains of the one-dimensional domain (sub-domains of the one dimensional domain that include the boundaries of the one-dimensional domain), and the location defined at a time can be mapped in a surjection to a value of the one-dimensional domain (and thus to a couple of values of allowed couples of transparencies).

The one-dimensional domain may comprise a first boundary (e.g. connected) sub-domain (i.e. corresponding to and including one boundary value) where the rendering of the first 3D modeled object is opaque (i.e. zero transparency) and the rendering of the second 3D modeled object is invisible (i.e. full/total transparency), and a second boundary (e.g. connected) sub-domain (i.e. corresponding to and including the other boundary value and disjoint from the first boundary sub-domain) where the rendering of the second 3D modeled object is opaque and the rendering of the first 3D modeled object is invisible. Such sub-domains can be reduced to boundary (single) values. By varying the value in the one-dimensional domain between the first boundary sub-domain and the second boundary sub-domain, the user can thereby put emphasis of a respective one of the first and second 3D object.

The one-dimensional domain may further comprise a central (e.g. connected) sub-domain (i.e. between the first boundary sub-domain and the second boundary sub-domain, and thus disjoint from these two disjoint sub-domains) where the renderings of both the first 3D modeled object and the second 3D modeled object are opaque. This provides a central position where both objects are fully visible. The central sub-domain may have a non-zero length (and thereby correspond to a non-zero length of positions where both the objects are visible). This allows to easily reach the central sub-domain (as there is a margin of action).

The one-dimensional domain may further comprise a first intermediary (e.g. connected) sub-domain between the first boundary sub-domain and the central sub-domain, and a second intermediary (e.g. connected) sub-domain between the second sub-domain and the central sub-domain, where the rendering of the first 3D modeled object is opaque and the rendering of the second 3D modeled object is transparent (e.g. and of varying transparency) in the first intermediary sub-domain; and the rendering of the second 3D modeled object is opaque and the rendering of the first 3D modeled object is transparent (e.g. and of varying transparency) in the second intermediary sub-domain. Moreover, transparency (of either the first or second 3D modeled object) may vary (e.g. substantially) continuously and (strictly) monotonically (increasing or decreasing) in the first and second intermediary sub-domains. This can be referred to as "cross fade tuning" later, as it provides such a visual effect. The variation can be of any type, e.g. linear or a square function.

The set of locations defined by the moving action of the pointing device may corresponding symmetrically to the one-dimensional domain. In other words, the one-dimensional domain may be symmetrical relative to the center of the central sub-domain, and the moving actions can similarly and correspondingly define symmetrical locations around a central location.

An example of the system is now discussed with reference to FIGS. 4-15.

In this example, the system makes use of a unique slider 60 (instead of, for example, three radio buttons) whose position corresponds to values of the earlier-mentioned one-dimensional domain (the set of positions of the slider corresponding symmetrically to the one-dimensional domain). Other user-interaction tools such as those discussed earlier can be contemplated. At one end position of the slider (zero length first boundary sub-domain, that is, a boundary point), type 1 parts (i.e. belonging to first 3D modeled object only) are visible (i.e. opaque) while type 2 parts (i.e. belonging to second 3D modeled object only) are hidden (full transparency, thereby leading to invisibility, even if displayed). At the other end position of the slider (zero length second boundary sub-domain that is, the other boundary point), type 2 parts are visible while type 1 parts are hidden. In between, a smooth cross fading is displayed depending on the slider position. The cross fading is designed in such a way that type 1 and type 2 parts are both visible and opaque over a small range of the slider (non-zero length central sub-domain). Also, type 1 parts may be displayed in a first color (e.g. red), type 2 parts may be in a second color (e.g. green), and type 0 parts (i.e. common to both objects)—e.g. always—in a third color (e.g. blue), transparency of type 0 parts being adjustable (e.g. by another unrelated user-interaction tool). In the example, the user typically manipulates the user-interaction tool by moving the mouse cursor onto the slider and pressing the mouse button, so that the slider is ready to move. Then, the user focuses on the 3D view, while maintaining the mouse button pressed. In this situation, by moving the mouse cursor, the designer activates the cross fading of the parts while focusing on the 3D view.

Finite state machine is now discussed to illustrate the ergonomic advantages of the system of the example. The best formalism to specify man/apparatus interactions is indeed a finite state machine. A finite state machine is defined in an abstract way by a finite set S, named the set of states, another finite state V, named the vocabulary and a mapping T: V×S→S, named the transition mapping. The machine is defined by a state and is able to read words of V. When reading a word w∈V, the machine changes its current state s∈S for another state x∈S. The new state depends on the current state s and the input word v and this dependency is captured by the transition mapping, meaning that x=T(w, s). All the intelligence of the state machine is captured by the transition mapping. An initial state $s_1$ and a sequence of words $(w_i)_{i=1, 2, \ldots}$ define a unique sequence of states $s_{i+1}=T(w_i, s_i)$.

A finite state machine is advantageously represented by a directed graph, named the transition graph. Nodes are states; arcs represent state changes and are labeled by words. For example, x=T(w,s) defines, in the directed graph, an arc labeled w from node s to node x. The transition graph includes |S| nodes and |S|×|V| arcs. An alternate representation is the transition table, which encodes all values of the transition mapping into a double entry table indexed by S and V.

$$\begin{array}{ccccc}
& w_1 & \ldots & w_i & \ldots & w_n \\
s_1 & T(w_1, s_1) & \ldots & T(w_i, s_1) & \ldots & T(w_n, s_1) \\
\vdots & \vdots & & \vdots & & \vdots \\
s_j & T(w_1, s_j) & \ldots & T(w_i, s_j) & \ldots & T(w_n, s_1) \\
\vdots & \vdots & & \vdots & & \vdots \\
s_m & T(w_1, s_m) & \ldots & T(w_i, s_m) & \ldots & T(w_n, s_n)
\end{array}$$

The state transition machine is a theoretical tool that can be used by to specify the behavior of the CAD system under the user's interactions. States represent the current situation of interactive devices. Words represent the actions that the user can do with these devices.

Now, a conceptual radio button behavior is discussed to highlight the advantages of the example system's slider over it.

Figure 4:
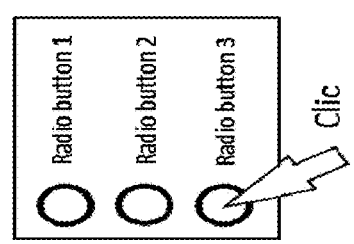

By definition, a radio button is selected by clicking on it. Clicking involves the following steps. Place the mouse cursor on the radio button, press the mouse button, release the mouse button. Pressing and releasing the mouse button must be done while the mouse cursor is on the radio button. If the mouse cursor is moved away from the radio button before the mouse button is released, the radio button is not selected. In short, selecting a radio button requires the full user's attention. A check box behaves the same way. FIG. 4 shows such actions. radio button 3 is selected first, then radio button 1 is selected, thus unselecting radio button 3. Radio button interactions are now discussed. In order to build the finite state machine, useful features are investigated in order to specify the use of two radio buttons for comparing geometries. Two radio buttons instead of three is enough to explain the complexity. The focus is what the user is looking at. It can be either the three dimensional view (3D view in the following), the first radio button or the second radio button. This is symbolized by set F={3D, RB1,RB2}. The mouse cursor is located on the screen either on the first radio button or the second radio button, which is symbolized by set MC={RB1, RB2}. The 3D view displays two situations, depending on which type of geometries is visible or invisible, which is symbolized by set W={1,2}. Consequently, the set of states includes all combinations of these characteristics, which is captured by the Cartesian product S=F×MC×W. For example (3D, RB1,2)∈S means that the user is watching the 3D view, the mouse cursor is located on the first radio button, and the situation 1 is displayed in the 3D view. The user can perform the following actions. Focus on first or second radio button or focus on the 3D view. Move the mouse cursor on the focus. Click where the mouse cursor is located. States and actions are designed in such a way that clicking is necessarily done on a radio button. Clicking on radio button 1 (resp. 2) while the 3D view displays situation 2 (resp. 1) changes this display to situation 1 (resp. 2). This is symbolized by the vocabulary V={f3D, fRB1, fRB2,mf, Click}. The number of states is |S|=12 leading to |S|×|V|=12×5=60 transitions. Table I is the state transition table.

TABLE I

State transition table of the radio button conceptual solution

| | Focus on 3D | Focus on RB1 | Focus on RB2 | Move cursor to focus | Click |
|---|---|---|---|---|---|
| (3D, RB1, 1) | * | (RB1, RB1, 1) | (RB2, RB1, 1) | ** | * |
| (3D, RB2, 1) | * | (RB1, RB2, 1) | (RB2, RB2, 1) | ** | (3D, RB2, 2) |
| (3D, RB1, 2) | * | (RB1, RB1, 2) | (RB2, RB1, 2) | ** | (3D, RB1, 1) |
| (3D, RB2, 2) | * | (RB1, RB2, 2) | (RB2, RB2, 2) | ** | * |
| (RB1, RB1, 1) | (3D, RB1, 1) | * | (RB2, RB1, 1) | * | * |
| (RB1, RB2, 1) | (3D, RB2, 1) | * | (RB2, RB2, 1) | (RB1, RB1, 1) | (RB1, RB2, 2) |
| (RB1, RB1, 2) | (3D, RB1, 2) | * | (RB2, RB1, 2) | * | (RB1, RB1, 1) |
| (RB1, RB2, 2) | (3D, RB2, 2) | * | (RB2, RB2, 2) | (RB1, RB1, 2) | * |
| (RB2, RB1, 1) | (3D, RB1, 1) | (RB1, RB1, 1) | * | (RB2, RB2, 1) | * |
| (RB2, RB2, 1) | (3D, RB2, 1) | (RB1, RB2, 1) | * | * | (RB2, RB2, 2) |
| (RB2, RB1, 2) | (3D, RB1, 2) | (RB1, RB1, 2) | * | (RB2, RB2, 2) | (RB2, RB1, 1) |
| (RB2, RB2, 2) | (3D, RB2, 2) | (RB1, RB2, 2) | * | * | * |

Figure 5:
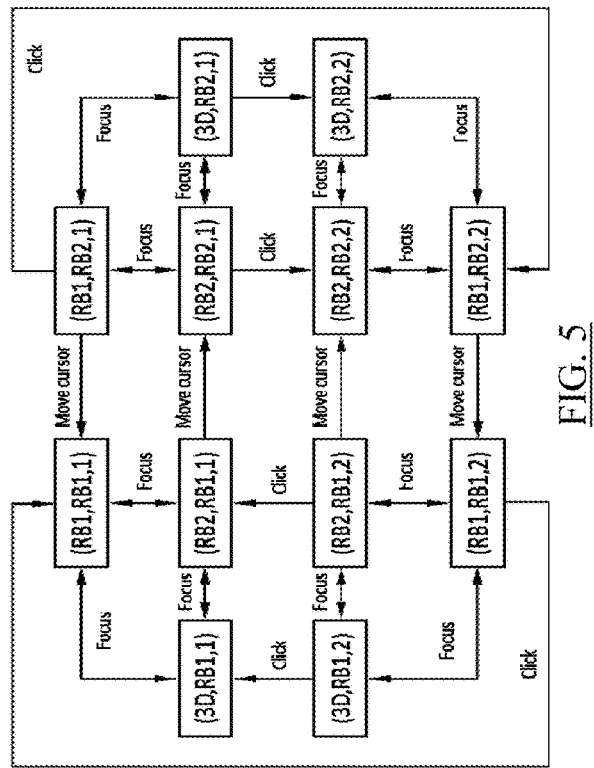

For readability, symbol "*" at a row s and column w means that the state s is unchanged when reading word w, that is s=T(w,s). For example, clicking on radio button 1 while the 3D view displays situation 1 has no effect. Symbol "**" at row s and column w means that action w is not relevant in state s. For example, in the context of this finite stae machine, the cursor is not supposed to be on the 3D view. So, the "move cursor to focus" is meaningless when the focus is on the 3D view. The corresponding transition graph is illustrated in FIG. 5.

The typical sequence is to start with state (3D, . . . , 1), meaning that the user is watching the 3D view where situation 1 is displayed. The intermediate state is (3D, . . . , 2), meaning that the user is watching the 3D view where situation 2 is displayed. The final state is (3D, . . . , 1) because the user needs to watch again situation 1 just after situation 2 for comparison purpose. Starting from state (3D, RB1,1), the transition sequence is as follows:

1. Focus on the second radio button: (RB2, RB1,1).
2. Move cursor on focus: (RB2, RB2,1).
3. Click: (RB2, RB2,2).
4. Focus on 3D view: (3D, RB2,2)
5. Focus on the first radio button: (RB1, RB2,2).
6. Move cursor on focus: (RB1, RB1,2).
7. Focus on 3D view: (3D, RB1,2)
8. Click: (3D, RB1,1).

The main drawback is that, from step 4, the user must stop watching the 3D view and must focus on the first radio button (step 5) in order to change the display of the 3D view. Clearly, there is no way to change the 3D view display and to keep the focus on the 3D view display, as proven by the transition graph. Nevertheless, it should be noticed that it is possible to click on a radio button while focusing on the 3D view, as exemplified by steps 7 and 8, which helps a little bit.

The advantageous slider behavior of the example method is now discussed.

The example implements the slider. Classically, a slider 60 includes a slider bar 62 and a slider button 64. The slider button 64 is indented to move along the slider bar 62, as represented on FIG. 6. The user manipulates the slider 60 according to the following steps. Put the mouse cursor 70 on the slider button 64, press the mouse button 64, move the mouse cursor 70 (e.g. according to motion 72) while the mouse button is pressed. Leaving the slider 60 is to release the mouse button. From the geometrical point of view, a slider features the following property: the slider button can be manipulated even when the mouse cursor moves away from the slider itself. This behavior offers very high ergonomics. Only the projection of the mouse cursor on the slider bar is taken into account to compute the slider button position. FIG. 7 illustrates a typical mouse motion 72. FIG. 8 illustrates the resulting slider button motion 80. It does not go beyond the slider bar's ends/extremities and it is not sensitive to lateral displacement of the mouse cursor 70.

From the mathematical point of view, the mouse cursor motion is represented by a planar curve $t \mapsto (x(t),y(t))$ parameterized with time t. The shape of this curve depends on the user's hand motion holding the mouse. The slider bar is the vertical interval $[y_{min}, y_{max}]$ on the y axis of FIGS. 9-11. The relevant data is the position of the slider button on the slider bar, noted z(t). Mathematically, z(t) is computed from the mouse cursor position according to the following formula.

$$z(t) = \frac{|y(t) - y_{min}| - |y(t) - y_{max}| + y_{min} + y_{max}}{2}$$

It does not involve x(t) and it is designed so that $y_{min} \leq z(t) \leq y_{max}$ for all t. FIG. 9 illustrates a typical human driven mouse motion through a planar curve. FIG. 10 illustrates the $t \mapsto y(t)$ corresponding variations. FIG. 11 illustrates the $t \mapsto z(t)$ corresponding variations. Notice the truncated variation within interval $[y_{min}, y_{max}]$.

The notion of cross fade tuning mentioned earlier is now discussed.

The cross fade tuning is another feature that can be added to the example. Type 1 and type 2 geometries are alternately made invisible, transparent and visible depending on the slider button position. Let $s(t) \in [0,1]$ be the slider button relative position on the slider bar, meaning that:

$$s(t) = \frac{z(t) - y_{min}}{y_{max} - y_{min}}$$

Figure 12:
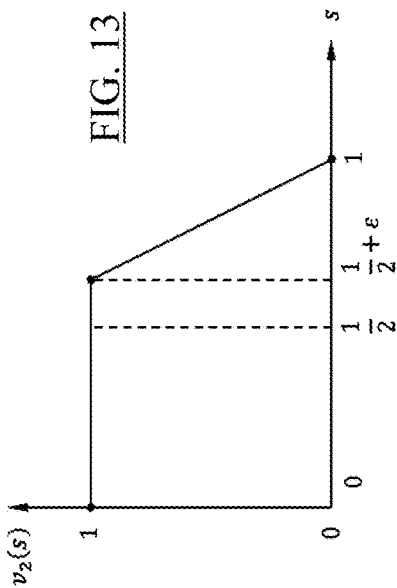

The visibility display is governed by the following strategy. When s=0, type 1 geometries are made invisible and type 2 geometries are made visible. When s=1, type 2 geometries are made invisible and type 1 geometries are made visible. When s changes from s=0 to s=½−ε the transparency $v_1(s)$ of type 1 geometries linearly changes from invisible $v_1(0)=0$ to visible $v_1(½−ε)=1$ according to a fading effect. When s changes from s=½−ε to s=1, type 1 geometries remain visible, meaning that $v_1(s)=1$. This is represented by FIG. 12. ε can typically be equal to 5% or even 10%.

Figure 13:
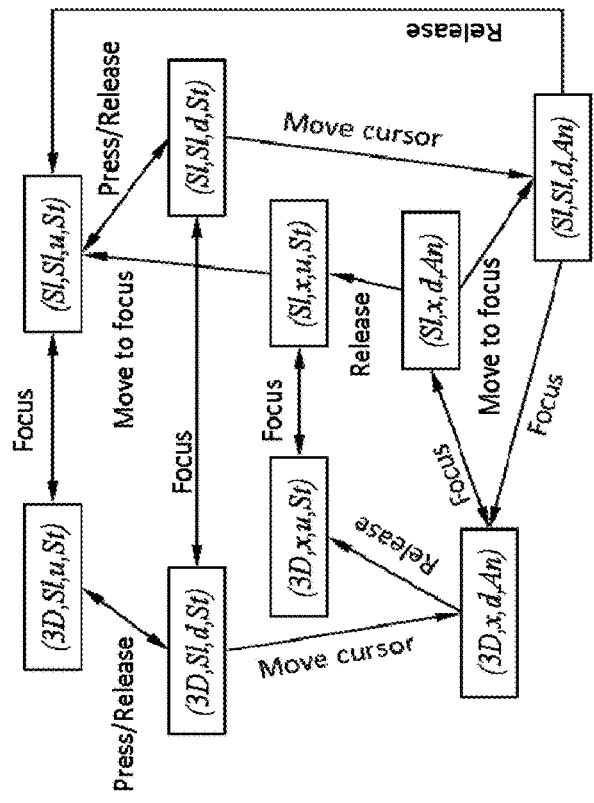

When s changes from s=0 to s=½+ε, type 2 geometries remain visible, meaning that $v_2(s)=1$. When s changes from s=½+ε to s=1, the transparency $v_2(s)$ of type 2 geometries linearly changes from visible $v_2(½+ε)=1$ to invisible $v_2(1)=0$ according to a fading effect. This is represented by FIG. 13.

The cross fading effect is obtained by simultaneously displaying type 1 and type 2 geometries according to $v_1(\bullet)$ and $v_2(\bullet)$ sharing the same s parameter. This means that when, at time t, the mouse cursor position is (x(t), y(t)), the visibility of type 1 geometries is $v_1(s(t))$ and the visibility of type 1 geometries is $v_2(s(t))$.

Figure 14:
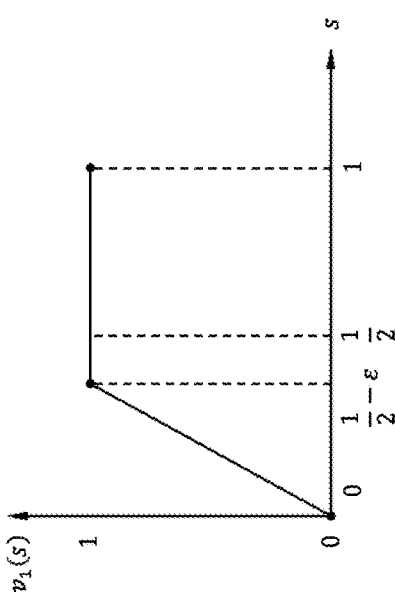

When $s(t) \in [½−ε, ½+ε]$, both type 1 and type 2 geometries are visible and partially overlapping in the three dimensional view (line 3 in table II). Moreover, varying s(t) value around ½−ε makes type 1 geometries transparent while type 2 geometries remain visible and opaque (lines 2 and 3 in table II). Similarly, varying s(t) value around ½+ε makes type 2 geometries transparent while type 1 geometries remain visible and opaque (lines 3 and 4 in table II). Table II gathers all possibilities and FIG. 14 represents them.

TABLE II

| | All possibilities for s(t) | | |
| --- | --- | --- | --- |
| | Slider button relative position | Type 1 geometries | Type 2 geometries |
| 1 | s = 0 | Invisible | Opaque |
| 2 | 0 < s ≤ ½ − ε | Transparent | Opaque |
| 3 | ½ − ε ≤ s ≤ ½ + ε | Opaque | Opaque |
| 4 | ½ + ε ≤ s < 1 | Opaque | Transparent |
| 5 | s = 1 | Opaque | Invisible |

Interactions when using a slider are now discussed.

In order to build the finite state machine, useful features to specify the use of the slider for comparing geometries are investigated. The focus is what the user is looking at. It can be either the 3D view, the slider or elsewhere. This is symbolized by set F={3D, Sl}. The mouse cursor is located on the screen either on the slider or elsewhere, which is symbolized by set MC={Sl, x}. The mouse button is either up or down, which is symbolized by set MB={u, d}. The 3D view is either animated, meaning that some dynamic cross fading effect is displayed under the slider motion, or static, which is symbolized by set W={St, An}. Consequently, the set of states includes all combinations of these characteristics, which is captured by the Cartesian product S=F×MC× MB×W. For example (3D, x, d, An) means that the user is watching the 3D view, the mouse cursor is not located on the slider, the mouse button is down and the 3D view is animated.

The user can perform the following actions. Focus on the slider or focus on the 3D view. Move the mouse cursor on the focus. Press or release the mouse button. Move the mouse cursor (in order to manipulate the sider button). This is symbolized by the vocabulary V={f3D, fSl, mf, pr, rl, mc}.

The theoretical number of states is |S|=16 leading to |S|×|V|=16×6=96 transitions. Fortunately, the number of states and transitions is reduced by taking into account common sense considerations. Indeed, not all states are meaningful. All states where the mouse button is up and the 3D view is animated are unreachable. State (3D, Sl, d, An) is unreachable because it is not possible to animate the cross fading by moving the cursor, focusing on the 3D view and maintaining the mouse cursor on the slider button. States (3D, x, d, St) and (Sl, x, d, St) are not relevant because, in the context of the invention, pressing the mouse button when the mouse cursor is not on the slider button has no effect. So, the number of relevant states is 9, and the transition table is table III.

TABLE III

Transition table of the slider solution of the example

|  | Focus 3D | Focus slider | Move focus | Press | Release | Move cursor |
|---|---|---|---|---|---|---|
| (3D, Sl, u, St) | * | (Sl, Sl, u, St) | ** | (3D, Sl, d, St) | * | * |
| (3D, Sl, d, St) | * | (Sl, Sl, d, St) | ** | * | (3D, Sl, u, St) | (3D, x, d, An) |
| (3D, x, u, St) | * | (Sl, x, u, St) | ** | ** | * | * |
| (3D, x, d, An) | * | (Sl, x, d, An) | ** | * | (3D, x, u, St) | * |
| (Sl, Sl, u, St) | (3D, Sl, u, St) | * | * | (Sl, Sl, d, St) | * | * |
| (Sl, Sl, d, St) | (3D, Sl, d, St) | * | * | * | (Sl, Sl, u, St) | (Sl, Sl, d, An) |
| (Sl, Sl, d, An) | (3D, x, d, An) | * | * | * | (Sl, Sl, u, St) | * |
| (Sl, x, u, St) | (3D, x, u, St) | * | (Sl, Sl, u, St) | (Sl, x, d, St) | * | * |
| (Sl, x, d, St) | (3D, x, d, An) | * | (Sl, Sl, d, An) | * | (Sl, x, u, St) | * |

Figure 15:
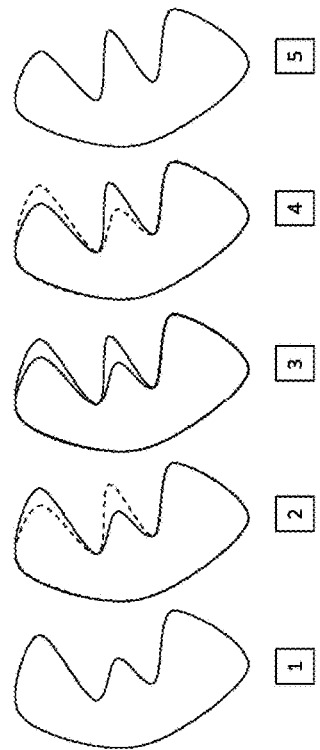

For readability, symbol "*" at a row s and column w means that the state s is unchanged when reading word w, meaning that s=T(w,s). Symbol "**" at row s and column w means that action w is not relevant in state s. For example, pressing the mouse button when the mouse cursor is not on the slider button. The corresponding transition graph is illustrated in FIG. 15.

The typical sequence is to start with state (3D, x, u, St) meaning that the user is watching the 3D view, the mouse cursor is not on the slider, the mouse button is not pressed and the 3D view is static. The target state is (3D, x, d, An) meaning that the user is watching an animated 3D view and that the mouse cursor is "somewhere" with the mouse button pressed. Starting from (3D, x, u, St), the transition sequence is as follows.

1. Focus on the slider: (Sl, x, u, St).
2. Move cursor on focus: (Sl, Sl, u, St).
3. Press mouse button: (Sl, Sl, d, St).
4. Focus on 3D view: (3D, Sl, d, St)
5. Move mouse cursor: (3D, x, d, An).

Clearly, state (3D, x, d, An) allows the user to play with cross fading effects while watching the 3D view and thus staying in this state. Mouse cursor location switches from Sl to x between steps 4 and 5 because, since the focus is no longer on the slider, it is not possible for the user to move the mouse cursor and keep it on the slider button. Fortunately, the property of the slider overcomes this difficulty.

The example allows the user to freely and smoothly navigate through these displays while maintaining the focus on the three dimensional view. This is because the slider button can be moved without keeping an eye on it, as illustrated in the following with reference to FIGS. 16-20 which illustrate real screenshots of the display of a prototype system used in an example of the method.

In this example, the user is designing a first 3D assembly 160 which represents an exercise bike in scene 161. The GUI includes comparison window 162 that integrates scene 163 (embedded in wider scene 161), that can be launched by the user wanting to perform a comparison with a second 3D assembly 164, which also represents an exercise bike. In the example system, the red color is dedicated to geometry that specifically belongs to first object 160 whereas the green color is dedicated to geometry that specifically belongs to second object 164. Blue is dedicated to common geometry 172.

The user can compare the first 3D assembly 160 and the second 3D assembly 164 by launching superposition of the display of both objects in scene 163 of window 162. Then the user can manipulate different user-interaction tools 170 provided in window 162 (for example in an upper ribbon) to conduct the comparison. In the case of the example, the user-interaction tools 170 are graphical user-interaction tools manipulated via a pointing device such as a mouse cursor. Alternatively or additionally, touch manipulation of the graphically displayed user-interaction tools 170 and/or of areas of the scene 163 can be contemplated, as mentioned earlier.

First, the user can manipulate slider 167 to locally adjust transparency of common parts (rendered in blue), e.g. the rendering of non-common parts (for instance those to be compared) being fixed (i.e. left untouched). In the example, transparency of a part can vary between 0 and 100 (any other scale can be implemented). This way, the user can decrease the visibility of common parts so as not to be disturbed by them and focus on parts specific to first assembly 160 or second assembly 164 and better see how both objects compare. The common parts/portion may be determined in any way, for example automatically. Similarly, the user can focus on a specific zone of interest of the scene/objects and apply an increase of transparency to other zones/portions (so that they are relatively more transparent than the focus zone), or equivalently a decrease of transparency of the selected zone, such selection being performed in any way via user-interaction. In the case of the example, the exercise bike represented by first object 160 geometrically differs from the exercise bike represented by second object 164 in the position of their seats (175 and 176) and of their handles (165 and 166), but their frames 172 have the same geometry. Now, in the case of the example, the user wants to focus on the handle (reference 165 for first assembly 160, and reference 166 for second assembly 164) of the exercise bike. Thus, throughout the method, transparency of seats 175 and 176 can be increased relative to handles 165 and 166 (in any way), as apparent from the figures. Such restriction is however only an option.

With this option, the user operates in effect an extraction of the first 3D modeled object and of the second 3D modeled object from a first larger 3D modeled object and the second 3D modeled object from a second larger 3D modeled object. The "larger" objects are called "assemblies" merely because the first and second objects are portions thereof, but they are similar to the first and second 3D modeled objects from a data structure point of view. The definition/extraction merely amounts to a visual highlighting of such portions, by imposing a minimum transparency threshold (possibly full transparency) to other portions of the base first and second larger objects (e.g. common part 172 and/or seat 175,176) that are not of interest (or that are of less interest). Thus, throughout the rest of the method, the "non-retained" portions (i.e. the other portions/the rest of the first and second assemblies) are displayed with high transparency (relatively to the handles 165,166). Now, the rendering of "non-retained" portions may be varied consistently (e.g. proportionally) with the non-uniform variation of the rendering of the handles 165, 166, or totally independently (or even kept fixed). This is a matter of implementation.

Now, on all of FIGS. 16-20, first object 165 and second object 166 are both displayed (i.e. a rendering is generated and loaded in scene 163). However, on FIG. 16 first object 165 is invisible (i.e. maximal transparency provided by the GPU, usually full transparency) and on FIG. 20 second object 166 is invisible. The transparency of both first object 165 and second object 166 can be controlled by the user via radio buttons 169 to some amount, but additionally and most importantly by (vertical) slider 168. Indeed, a repetition of a vertical move (e.g. a continuous vertical move) of slider 168 from its bottom extremity (FIG. 15) to its top extremity (FIG. 20), in any way (for example by a click on slider bar but more ergonomically—as explained earlier—by an activation by a first click on the slider button and then a continuous move while maintaining the click), increases progressively (i.e. monotonically, non-strictly) transparency of second object 166 while it simultaneously decreases progressively (i.e. monotonically, non-strictly) transparency of first object 165 (and inversely). The monotonic progressions of transparency are as continuous as the resolution of the slider allows. In an implementation, slider 168 can be moved vertically substantially continuously.

FIGS. 16-20 respectively illustrate slider 168 being progressively moved up and a corresponding non-uniform variation of the rendering of specific geometry (165, 166, 175, 176) of both assemblies, including rendering in the second boundary sub-domain of the earlier-mentioned one-dimensional domain (corresponding to the single bottom extremity position of slider 168), a rendering in the second intermediary sub-domain (corresponding to next positions of slider 168), the rendering of the central sub-domain (corresponding to central positions of slider 168), a rendering in the first intermediary sub-domain (corresponding to next positions of slider 168), the rendering in the first boundary sub-domain of the earlier-mentioned one-dimensional domain (corresponding to the single top extremity position of slider 168). The one-dimensional domain in the example can correspond to the range [0, 100] of integers that represent the relative transparency between first object 165 and second object 166 (the values 0 and 100 being the boundary sub-domains, a central range, for example [45, 55], being the central sub-domain, and the two remaining ranges being the intermediary sub-domains), and the position of slider 168 can designate any such integer.

Figure 16:
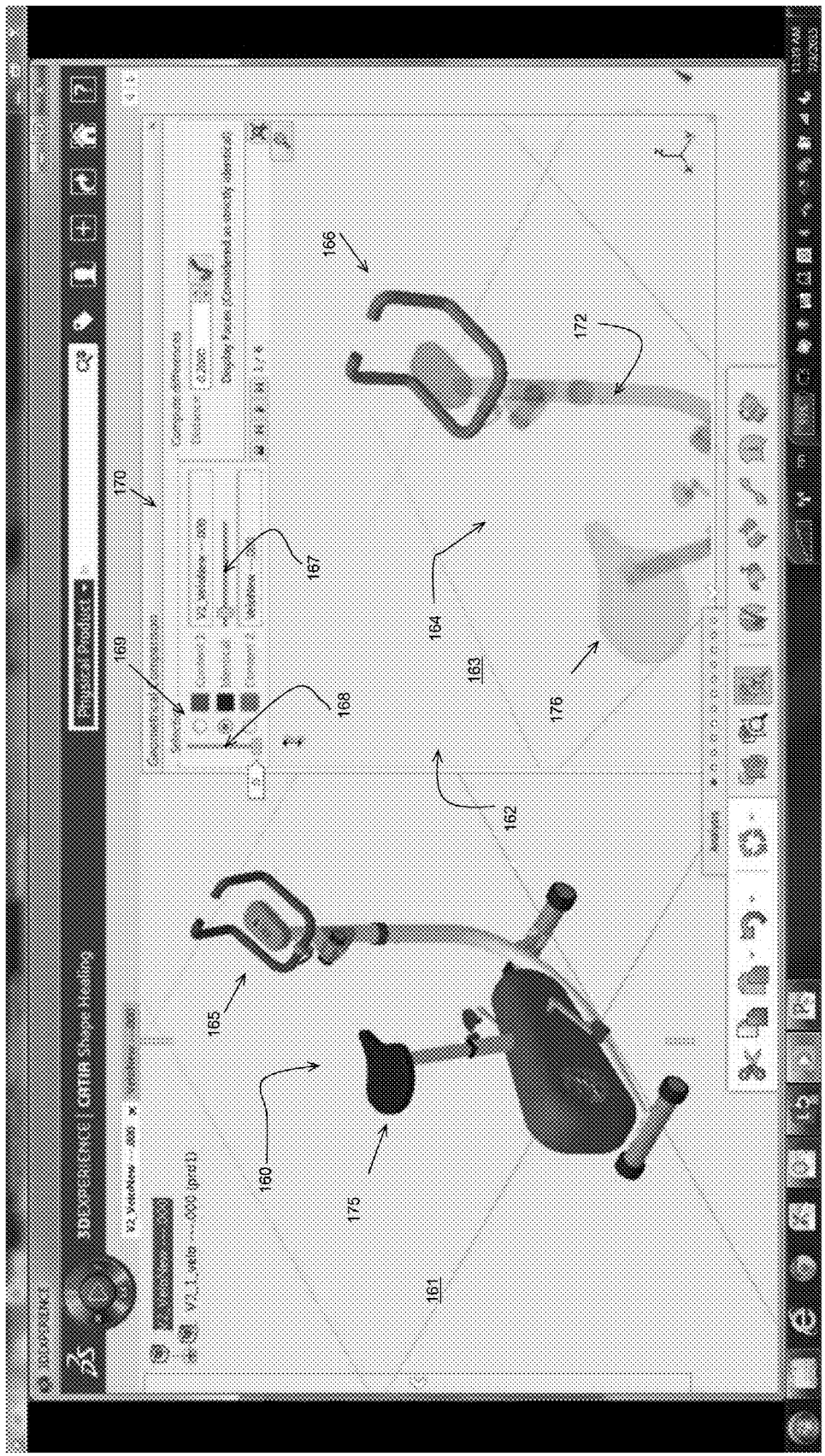
FIGS. 16, 17, 18, 19 and 20 illustrate real screenshots (and thus in colors) of the display of a prototype system used in an example of the method.
Figure 17:
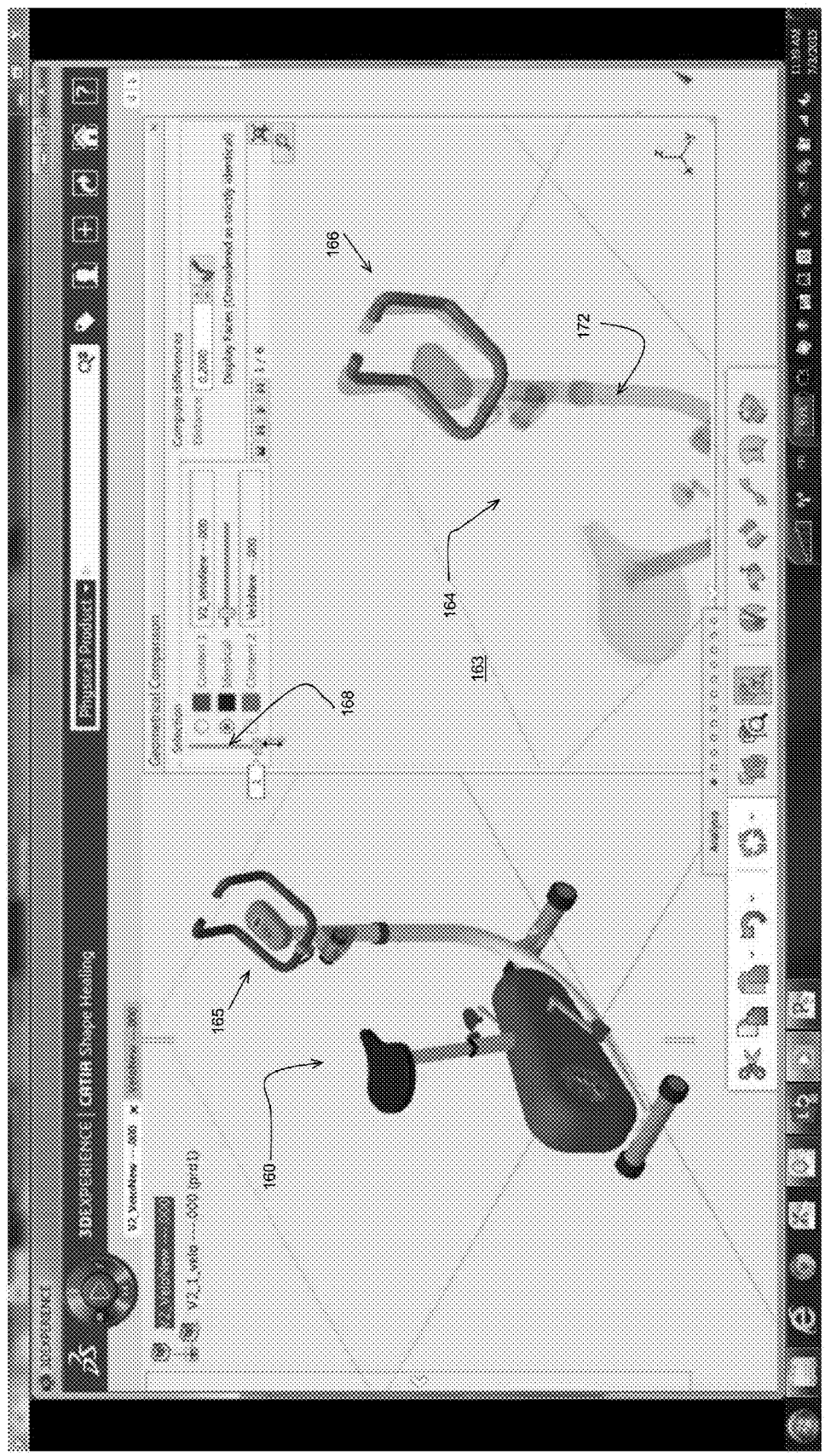
Figure 18:
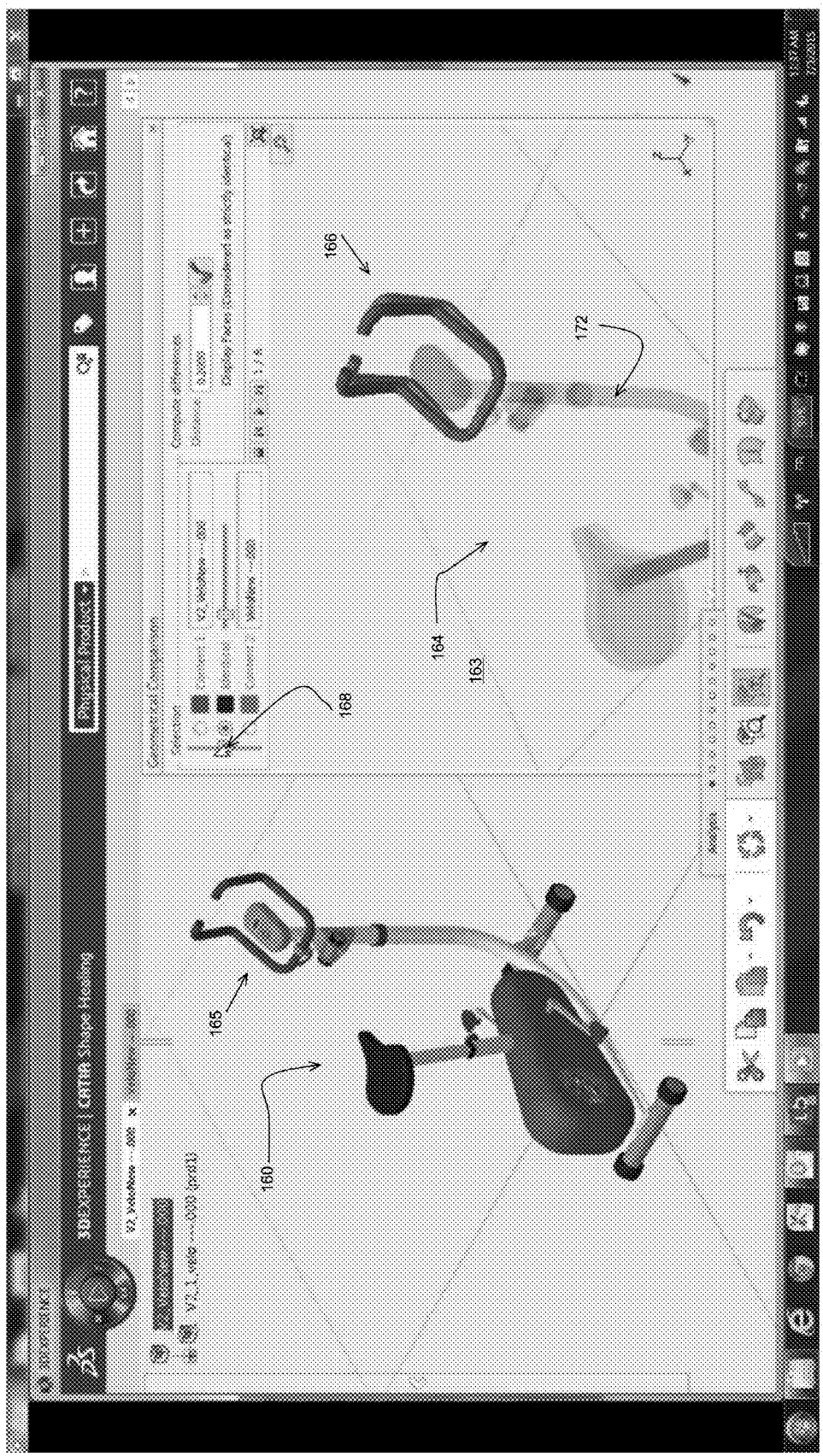
Figure 19:
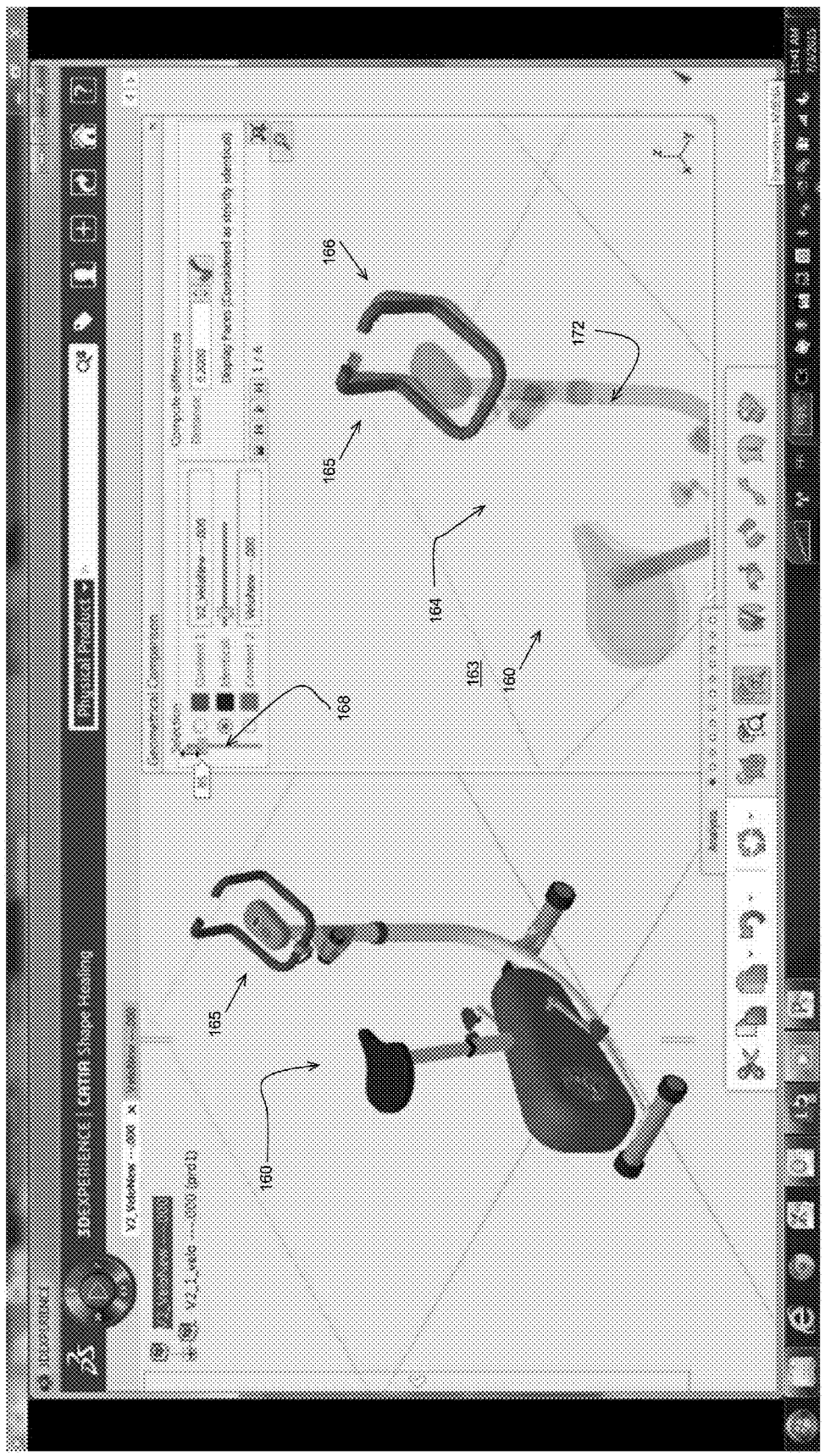
Figure 20:
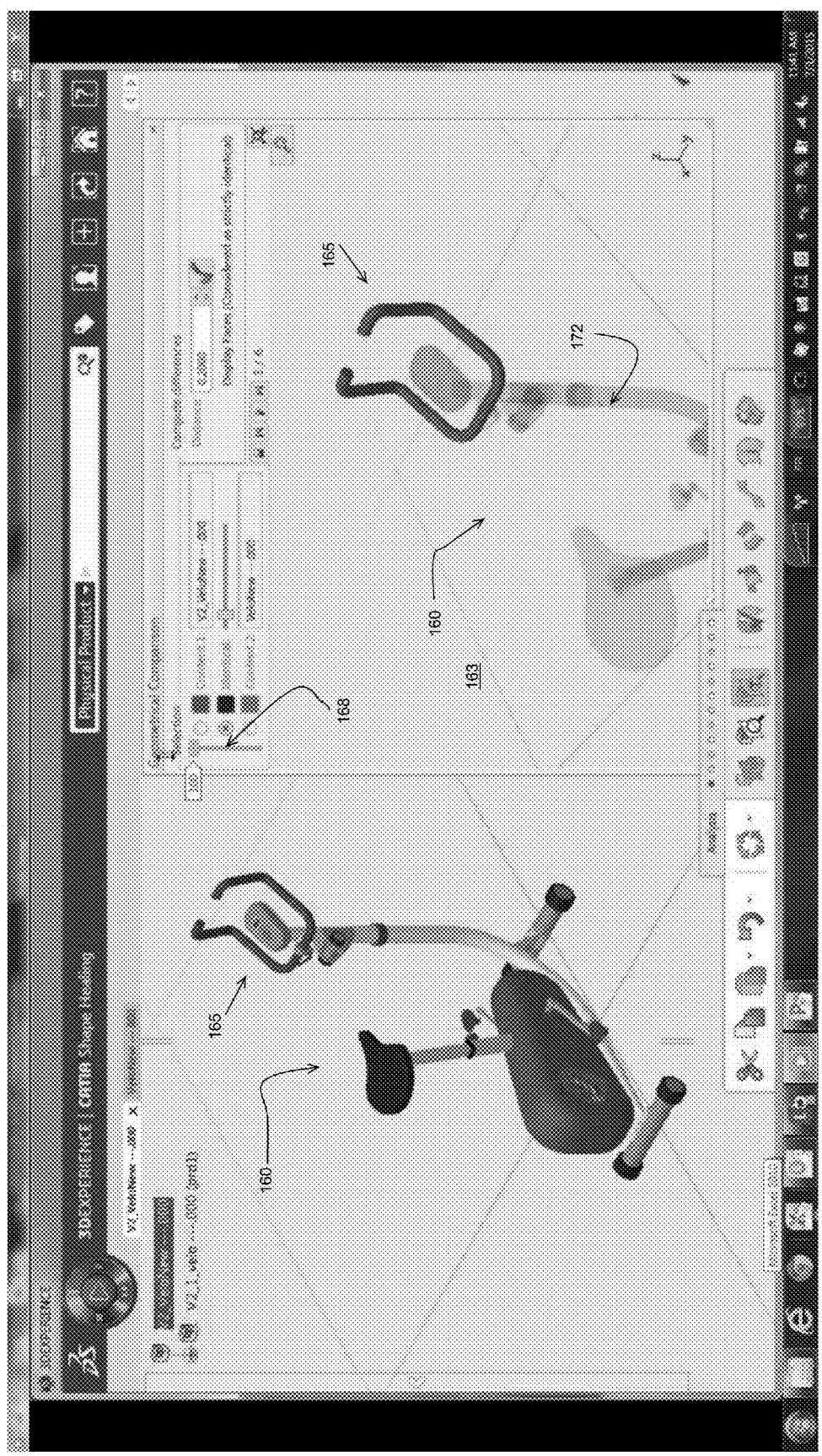

Thus, by manipulating slider 168, the user can smoothly and progressively vary (non-uniformly) the renderings of first larger object 160 and second larger object 164 so as to cross fade parts geometry (165, 166, 175, 176) thereof and potentially make parts of any of them disappear, in a continuum of renderings between those of FIG. 16 and FIG. 20 (passing by those of FIGS. 17-19). The manipulation of slider 168 being easy and possibly without a look, as mentioned earlier, the user can always look at scene 163 and understand more easily the differences between the two objects.

The invention claimed is:

1. A computer-implemented method for comparing a first 3D modeled object and a second 3D modeled object that each represent a part or an assembly of parts, the first 3D modeled object including a first graphical representation and the second 3D modeled object including a second graphical representation, comprising:
   displaying the first 3D modeled object and the second 3D modeled object superposed in a same scene so that the first graphical representation is positioned at a location substantially confounded with a location of the second graphical representation in the scene; and
   upon manipulation of a user-interaction tool that controls at least one non-uniform variation of the rendering of both the first 3D modeled object and the second 3D modeled object, updating the displaying of the first 3D object and the second 3D object, the user-interaction tool being configured to be manipulated via a predetermined set of at least one action, a repetition of each respective action of the set controlling a respective non-uniform variation of the rendering of both the first 3D modeled object and the second 3D modeled object, the non-uniform variation being progressively performed with the repetition,
   wherein the user-interaction tool includes a slider, a graphical element representing the slider is displayed to the user, an activation action is performed prior to the respective moving action and the respective moving action is a move of the graphical representation of the slider in a respective direction, and/or the user-interaction tool includes a touch device and the respective moving action is a single touch moving action in a respective one of a predetermined pair of directions and/or a double touch moving action which is a respective one of a spreading gesture or a joining gesture, and
   wherein the respective moving action allows a user to browse through a continuum of rendering states which include at least three different rendering states, each of the at least three rendering states corresponding to a different relative visibility of the first 3D modeled object with respect to the second 3D modeled object displayed to the user.

2. The method of claim 1, wherein the predetermined set of at least one action comprises a first action and a second action, the variation controlled by a repetition of the first action being inverse to the variation controlled by a repetition of the second action.

3. The method of claim 2, wherein the first action and the second action each result from a pressure of a respective predetermined key, a scrolling in a respective direction and/or a respective moving action of a pointing device.

4. The method of claim 2, wherein the first action increases visibility of the second 3D modeled object relative to the first 3D modeled object, and the second action thereby increases visibility of the first 3D modeled object relative to the second 3D modeled object, the first action and the second action thereby controlling relative visibility between the first 3D modeled object and the second 3D modeled object in a one-dimensional domain.

5. The method of claim 4, wherein the first action increases the value of a predetermined rendering parameter for the first three-dimension object while decreasing the value of the predetermined rendering parameter for the second three-dimension object, and the second action increases the value of the predetermined rendering parameter for the second three-dimension object while decreasing the value of the predetermined rendering parameter for the first three-dimension object.

6. The method of claim 5, wherein the predetermined rendering parameter is transparency.

7. The method of claim 6, wherein the one-dimensional domain comprises a first boundary sub-domain where the rendering of the first 3D modeled object is opaque and the rendering of the second 3D modeled object is invisible, and a second boundary sub-domain where the rendering of the second 3D modeled object is opaque and the rendering of the first 3D modeled object is invisible.

8. The method of claim 7, wherein the one-dimensional domain further comprises a central sub-domain where the renderings of both the first 3D modeled object and the second 3D modeled object are opaque, the central sub-domain having optionally a non-zero length.

9. The method of claim 8, wherein the one-dimensional domain further comprises a first intermediary sub-domain between the first boundary sub-domain and the central sub-domain, and a second intermediary sub-domain between the second sub-domain and the central sub-domain,
the rendering of the first 3D modeled object is opaque and the rendering of the second 3D modeled object is transparent in the first intermediary sub-domain, and
the rendering of the second 3D modeled object is opaque and the rendering of the first 3D modeled object is transparent in the second intermediary sub-domain.

10. The method of claim 9, wherein transparency varies continuously and monotonically in the first and second intermediary sub-domains.

11. The method of claim 1, wherein the user-interaction tool is further configured to be manipulated via at least one other predetermined action that defines the first 3D modeled object as a portion of a first 3D assembly and the second 3D modeled object as a portion of a second 3D assembly, the other portion of the first 3D assembly and the other portion of the second 3D assembly being displayed throughout the method with a transparency higher than respectively the first 3D modeled object and the second 3D modeled object.

12. A non-transitory computer program comprising instructions for performing a computer-implemented method for comparing a first 3D modeled object and a second 3D modeled object that each represent a part or an assembly of parts, the first 3D modeled object including a first graphical representation and the second 3D modeled object including a second graphical representation, the method comprising:
displaying the first 3D modeled object and the second 3D modeled object superposed in a same scene so that the first graphical representation is positioned at a location substantially confounded with a location of the second graphical representation in the scene; and
upon manipulation of a user-interaction tool that controls at least one non-uniform variation of the rendering of both the first 3D modeled object and the second 3D modeled object, updating the displaying of the first 3D object and the second 3D object, the user-interaction tool being configured to be manipulated via a predetermined set of at least one action, a repetition of each respective action of the set controlling a respective non-uniform variation of the rendering of both the first 3D modeled object and the second 3D modeled object, the non-uniform variation being progressively performed with the repetition,
wherein the user-interaction tool includes a slider, a graphical element representing the slider is displayed to the user, an activation action is performed prior to the respective moving action and the respective moving action is a move of the graphical representation of the slider in a respective direction, and/or the user-interaction tool includes a touch device and the respective moving action is a single touch moving action in a respective one of a predetermined pair of directions and/or a double touch moving action which is a respective one of a spreading gesture or a joining gesture, and
wherein the respective moving action allows a user to browse through a continuum of rendering states which include at least three different rendering states, each of the at least three rendering states corresponding to a different relative visibility of the first 3D modeled object with respect to the second 3D modeled object displayed to the user.

13. A system comprising:
a processor coupled to a memory and to a user-interaction tool, the memory having stored thereon a computer program comprising instructions for comparing a first 3D modeled object and a second 3D modeled object that each represent a part or an assembly of parts, the first 3D modeled object including a first graphical representation and the second 3D modeled object including a second graphical representation, the instructions causing the processor to be configured to
display the first 3D modeled object and the second 3D modeled object superposed in a same scene so that the first graphical representation is positioned at a location substantially confounded with a location of the second graphical representation in the scene, and
upon manipulation of a user-interaction tool that controls at least one non-uniform variation of the rendering of both the first 3D modeled object and the second 3D modeled object, update the displaying of the first 3D object and the second 3D object, the user-interaction tool being configured to be manipulated via a predetermined set of at least one action, a repetition of each respective action of the set controlling a respective non-uniform variation of the rendering of both the first 3D modeled object and the second 3D modeled object, the non-uniform variation being progressively performed with the repetition,
wherein the user-interaction tool includes a slider, a graphical element representing the slider is displayed to the user, an activation action is performed prior to the respective moving action and the respective moving action is a move of the graphical representation of the slider in a respective direction, and/or the user-interaction tool includes a touch device and the respective moving action is a single touch moving action in a respective one of a predetermined pair of directions and/or a double touch moving action which is a respective one of a spreading gesture or a joining gesture, and
wherein the respective moving action allows a user to browse through a continuum of rendering states which include at least three different rendering states, each of the at least three rendering states corresponding to a different relative visibility of the first 3D modeled object with respect to the second 3D modeled object displayed to the user.

14. The method of claim 1, wherein the non-uniform variation is progressively performed with the repetition increasing the relative visibility of one of the first 3D modeled object and the second 3D modeled object with respect to the second 3D modeled object or the first 3D modeled object respectively, thereby allowing the user to browse through the continuum of rendering states which include the at least three different rendering states.

* * * * *